US005542718A

United States Patent [19]
Gronwick et al.

[11] Patent Number: 5,542,718
[45] Date of Patent: Aug. 6, 1996

[54] ADJUSTABLE TAIL GROUND JOINT

[75] Inventors: Jerry P. Gronwick, Park Ridge; Leonard A. Koniewicz, Chicago, both of Ill.

[73] Assignee: Sloan Valve Company, Franklin Park, Ill.

[21] Appl. No.: 399,196

[22] Filed: Mar. 6, 1995

[51] Int. Cl.⁶ .................. F03C 1/00; F16L 27/00; F16L 19/00
[52] U.S. Cl. .................. 285/357; 285/393; 285/298; 285/169; 4/252.3
[58] Field of Search .................. 285/298, 356, 285/357, 393, 169; 4/252.3, 252.2

[56] References Cited

U.S. PATENT DOCUMENTS

| | | | |
|---|---|---|---|
| 883,122 | 3/1908 | Steneck | 285/357 |
| 931,940 | 8/1909 | Madden | 285/357 |
| 1,003,770 | 9/1911 | McDonald | 285/393 |
| 1,592,224 | 7/1926 | Pieper | 285/357 |
| 1,707,087 | 3/1929 | Little | 285/357 |
| 3,054,119 | 9/1962 | Manas et al. | 4/252.3 |
| 3,201,155 | 8/1965 | Billeter et al. | 285/350 |
| 3,686,695 | 8/1972 | Mielbalk et al. | 4/252.3 |
| 4,777,669 | 10/1988 | Rogus | 285/340 |
| 4,900,180 | 2/1990 | Takikawa | 285/357 |
| 4,968,067 | 11/1990 | Whiteside | 285/347 |

FOREIGN PATENT DOCUMENTS

| | | | |
|---|---|---|---|
| 4237218 | 5/1994 | Germany | 285/357 |
| 406685 | 2/1934 | United Kingdom | 285/238 |

*Primary Examiner*—Eric K. Nicholson
*Attorney, Agent, or Firm*—Dorn, McEachran, Jambor & Keating

[57] ABSTRACT

An adjustable plumbing conduit for connecting the inlet of a flush valve body and the outlet of a control valve wherein the flush valve body inlet has interior threads and the control valve outlet has exterior threads. The adjustable plumbing conduit includes an adjustable tail having an exterior thread on a portion thereof and a tapered nose which is in contact with an interior mating surface on the control valve outlet. There is an outward projection on the adjustable tail adjacent the tapered nose, which outward projection coacts with an inwardly directed shoulder of a coupling nut which is threaded onto the exterior of the control valve inlet and thereby holds the adjustable tail to the control valve. There is a sleeve having interior and exterior threads, with the interior threads attaching the sleeve onto the exterior of the adjustable tail and the exterior threads attaching the sleeve into the flush valve threaded inlet.

5 Claims, 1 Drawing Sheet

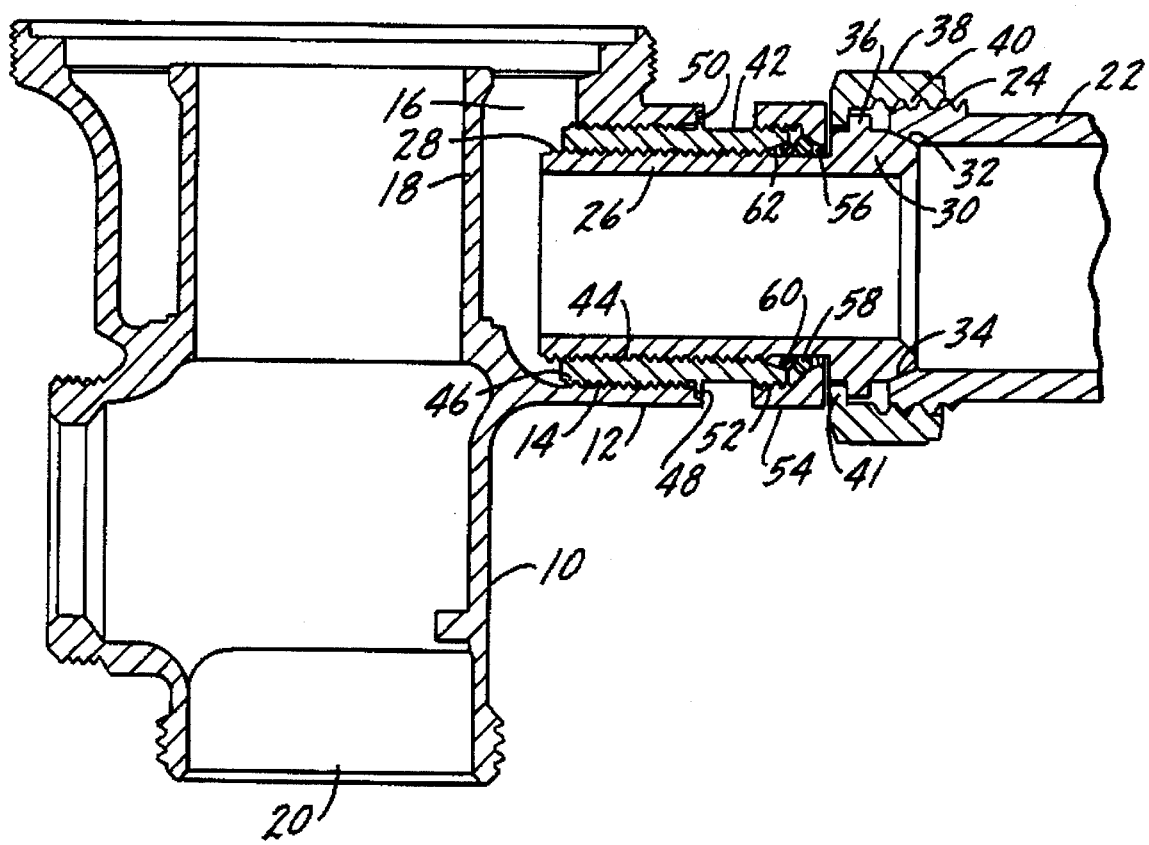

5,542,718

ADJUSTABLE TAIL GROUND JOINT

THE FIELD OF THE INVENTION

As is well known in the art, public washrooms use flush valves or flushometers as they are frequently termed to provide a measured volume of water to flush a water closet or urinal. A plumbing fixture known as a control valve or control stop is positioned adjacent the flush valve and provides a means of shutting off inlet water to the flush valve for replacement or maintenance thereof. Normally the centerline of the inlet pipe to the control valve and the centerline of the flush valve will vary from 4½" to 5½". However, there are instances, particularly where the flush valve of one manufacturer is being connected to the control valve of a second manufacturer where, due to the size and shape of the particular plumbing fixtures, the centerline distance will be greater than that set forth above. Also, there are instances in which the outlet of the control valve and the inlet of the flush valve, where these products are from different manufacturers, cannot be coupled together with a single conduit, known in the industry as an adjustable tail. The present invention provides an adjustable tail joint which is suitable to connect flush valves and control valves in which the centerline distance is different than the trade conventional 4½" to 5½" and in which the relative diameters of the flush valve inlet and the control valve outlet may differ to the extent that a single adjustable tail element will not provide a leakproof connection therebetween.

SUMMARY OF THE INVENTION

The present invention relates to adjustable plumbing conduits and particularly to such a conduit for providing a variable length connection between the inlet of a flush valve body and the outlet of a control valve.

A primary purpose of the invention is an adjustable plumbing conduit for the use described which is securely attached to both the flush valve and to the control valve and provides for variable spacing between these two plumbing elements.

Another purpose is a simply constructed, reliably operable plumbing conduit for connecting the inlet of a flush valve body and the outlet of a control valve, even where these plumbing fixtures are spaced apart a distance greater than the trade common 4½" to 5½".

Another purpose is a plumbing conduit as described which is useful with various types of flush valves.

Other purposes will appear in the ensuing specification, drawing and claims.

BRIEF DESCRIPTION OF THE DRAWINGS

The invention is illustrated diagrammatically in the drawing figure which is a vertical section through a flush valve body, control valve outlet and the adjustable connection therebetween.

DESCRIPTION OF THE PREFERRED EMBODIMENT

Adjustable connections between a flush valve and a control valve, commonly used plumbing fixtures in a public washroom, are shown in U.S. Pat. No. 3,201,155 owned by Sloan Valve Company, assignee of the present application. However, the connection in the '155 patent has limited utility as only a single element forms the adjustable connection and as such there is a limit to the distance between the centerline of the flush valve and the centerline of the control valve inlet. Further, this connection requires that both the flush valve and the control valve be made by a single manufacturer so that there is consistency in the diametral relationships of all of the elements. The present invention provides an adjustable connection which is useful to connect the flush valve of one manufacturer with the control valve of a second manufacturer and is useful with all types of flush valves which have a flush valve body with an interiorly threaded inlet.

In the drawing, the flush valve body is indicated at 10 and as shown in the drawing, this is the flush valve body for a ROYAL brand flush valve sold by Sloan Valve Company. The invention should not be limited to this specific type of flush valve, as other flush valves, for example the REGAL, CROWN, and GEM flush valves, as well as other flush valves sold by Sloan Valve Company and other plumbing fixture manufacturers, all are suitable for use with the present invention.

The flush valve body 10 has an inlet 12 with an interior thread 14. Water will normally pass into the flush valve body 10 through the inlet 12, into a chamber 16 surrounding a barrel 18. The top of the barrel is closed, and in the ROYAL valve such closure is by a flexible diaphragm. When the diaphragm is lifted, water will flow through the barrel and through the flush valve outlet 20.

The control valve, or control stop as it is often termed, is normally positioned between +e,fra 4+ee " and +e,fra 5+ee " from the centerline of the flush valve. This spacing is determined by the centerline of the inlet pipe for the control valve. In the drawing, the outlet of the control valve is indicated at 22 and has an exterior thread indicated at 24.

In order to provide the adjustable length connection between the control valve and the flush valve, there is an adjustable tail 26 which has an exterior thread 28 and a nose 30. The nose 30 has a tapered or conical surface 32 which coacts with a mating conical surface 34 at the end of the control valve outlet 22. The adjustable tail 26 further has a circumferential outwardly extending projection 36 which is utilized in connecting the adjustable tail to the control valve.

A coupling nut 38 having interior threads 40 which coact with the threads 24 on the exterior of the control valve outlet 22 has an inwardly directed shoulder 42 which cooperates with the projection 36 in attaching the adjustable tail 26 to the control valve outlet 22.

An adjustable sleeve 42 has an interior thread 44 which cooperates with the exterior thread 28 on the adjustable tail 26 to provide for variable positioning of these two elements. The sleeve 42 further has an exterior thread 46 which is threaded into the thread 14 on the interior of the flush valve inlet 12. Thus, the sleeve 42 can be variably positioned within the flush valve inlet. However, the sleeve 42 has an external projection 48 which is positioned within a recess 50 at the flush valve inlet to limit the depth to which the sleeve 42 can extend into the threaded flush valve inlet 12.

The sleeve 42 has a further threaded area 52 at its outward end which cooperates with the interior thread on a coupling nut 54. Nut 54 has an interior chamber 56 within which are positioned a brass stop ring 58 and an 0-ring seal 60. The seal is forced against an interior slanted wall 62 of the sleeve 42. The coupling nut 54 will be tightened onto the threads 52 of the sleeve 42 and the force applied by this attachment will drive the stop ring into the exterior of adjustable tail 26 to fix the relative positions of the adjustable tail and the sleeve 42. This provides a means for attaching sleeve 42 and thus the adjustable tail to the flush valve, whereas, coupling nut 38 provides the means for attaching the adjustable tail to the control valve.

Adjustment of the length of the described fitting is brought about by relative movement between the adjustable tail 26 and sleeve 42. Once the relative positions of these two elements are located so as to accommodate the centerline distance between the flush valve and the inlet pipe for the control valve, the coupling nut 54 may be tightened to fix the relative positions of sleeve 42 and adjustable tail 26.

Whereas the preferred form of the invention has been shown and described herein, it should be realized that there may be many modifications, substitutions and alterations thereto.

The embodiments of the invention in which an exclusive property or privilege is claimed are defined as follows:

1. An adjustable plumbing conduit for connecting the inlet of a flush valve body and the outlet of a control valve, the flush valve body inlet being threaded on the interior thereof and the control valve outlet being threaded on the exterior thereof, said adjustable plumbing conduit including:

an adjustable tail having an exterior thread on a portion thereof, and a tapered nose formed and adapted to be in contact with an interior mating surface on the control valve outlet, an outward projection on said adjustable tail adjacent said tapered nose, a coupling nut threaded onto the exterior of the control valve inlet and having an inward shoulder which coacts with the adjustable tail projection to attach the adjustable tail to the control valve outlet, a sleeve having interior and exterior threads thereon, with the interior threads attaching the sleeve onto the exterior of the adjustable tail and the exterior threads attaching the sleeve into the flush valve threaded inlet, and means for fixing the relative positions of said sleeve and said adjustable tail.

2. The adjustable plumbing conduit of claim 1 wherein said sleeve has an outward projection which is positioned for contact with an end surface of the flush valve inlet, to limit the inward extension of said sleeve into the inlet.

3. The adjustable plumbing conduit of claim 1 wherein the means for fixing the relative positions of said sleeve and said adjustable tail include a seal ring positioned between adjacent surfaces of said adjustable tail and sleeve, a stop ring positioned adjacent to the seal ring, and a coupling member attached onto the exterior of the sleeve and urging said stop ring and seal toward said adjustable tail.

4. The adjustable plumbing conduit of claim 3 wherein said sleeve has a second exterior threaded surface thereon, with said coupling member being threaded onto said second threaded surface of said sleeve.

5. The adjustable plumbing conduit of claim 4 wherein said coupling member has a tapered surface which drives said stop ring into exterior contact with said adjustable tail as said coupling member is threaded onto said sleeve.

* * * * *